UNITED STATES PATENT OFFICE.

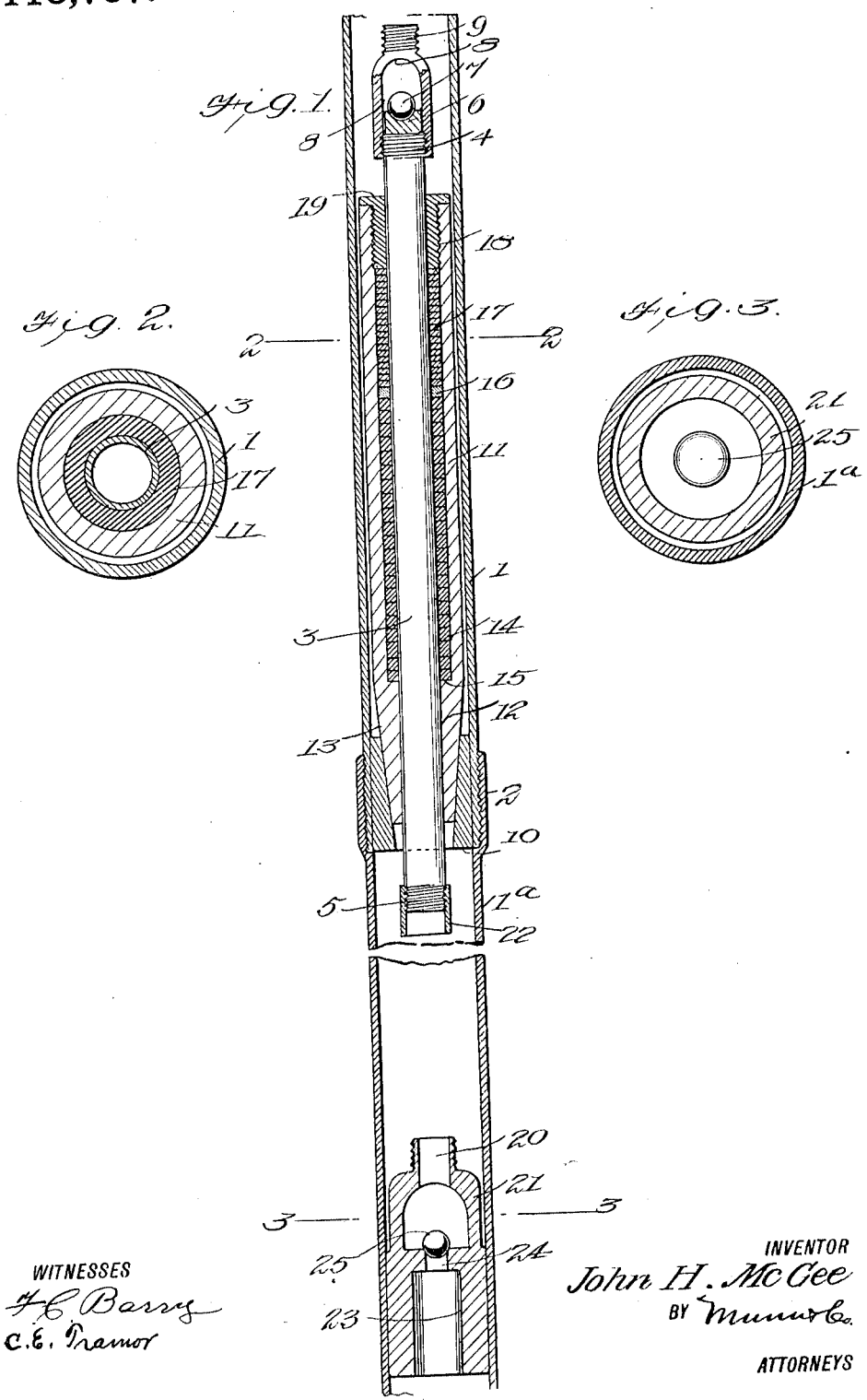

JOHN HENRY McGEE, OF VIVIAN, LOUISIANA.

SAND-PUMP FOR OIL-WELLS.

1,118,787.  Specification of Letters Patent.  Patented Nov. 24, 1914.

Application filed December 11, 1913. Serial No. 806,019.

*To all whom it may concern:*

Be it known that I, JOHN H. McGEE, a citizen of the United States, and a resident of Vivian, in the parish of Caddo and State of Louisiana, have invented a new and useful Improvement in Sand-Pumps for Oil-Wells, of which the following is a specification.

My invention is an improvement in sand pumps for oil wells and the like, and has for its object to provide a pump of the character specified, especially adapted for removing sand and mud from deep wells, as for instance, driven wells and the like.

In the drawings:—Figure 1 is a longitudinal section of the improved pump, and Figs. 2 and 3 are sections on the lines 2—2 and 3—3, respectively, of Fig. 1.

The present embodiment of the invention is shown in connection with a well casing consisting of sections 1 and 1ª, each section having its upper end enlarged and internally threaded as shown at 2, to receive the externally threaded lower end of the succeeding section.

The pump consists of a tubular casing 3 of smaller size than the casing 1—1ª, and the upper and lower ends of the casing 3 are externally threaded as shown at 4 and 5, respectively. A valve seat 6 is arranged at the upper end of the tubular casing, the seat having an opening through the same, and a ball valve 7 coöperates with the seat. The ball valve 7 is limited in its movement with respect to the seat by means of a cage 8, the said cage being threaded on to the upper end 4 of the tubular casing, and the cage is provided with a threaded nipple 9, for connection with a pump rod or other operating mechanism for the pump.

A tubular seat 10 is arranged within one of the sections of the well casing, the section 1 in the present instance, and the said seat has a frusto-conical bore, and a cylindrical exterior. The seat fits tightly within the casing, and a stuffing box 11 engages the seat, the said stuffing box having a tapering lower end fitting tightly within the frusto-conical bore of the seat. The stuffing box is of tubular form and fits loosely within the well casing, and at its lower end the bore of the stuffing box is reduced as shown at 12. A packing 14 is arranged within the bore of the stuffing box between the same and the tubular casing 3, and the lower end of the packing rests upon an annular shoulder 15 formed between the body of the bore of the seat and the reduced portion 12.

A ring 16 is arranged within the bore of the stuffing box above the packing, and a coil spring 17 is arranged above the ring, the spring encircling the tubular casing 3 within the bore of the stuffing box. At its upper end the bore of the stuffing box is internally threaded as shown at 18, and a packing nut 19 is engaged with the said threaded portion, the packing nut fitting closely around the tubular casing 3, and closing the space between the said tubular casing and the stuffing box.

A nut 22 is threaded on to the lower end 5 of the tubular casing 3, and the said nut is adapted to engage at its upper end the lower end of the stuffing box to remove the stuffing box from the seat when desired. A foot valve 23 is arranged in the well casing near the bottom thereof, and the said foot valve has a port 24, whose upper end forms a valve seat with which coöperates a ball valve 25. The upper end of the valve seat is a cage 21, having an externally threaded nipple 20. In practice, the tubular casing 3 is about six feet in length, and the foot valve would be arranged approximately eight feet below the lower end of the casing, and the nut or sleeve 22 is preferably of brass.

In operation, the tubular casing 3 is reciprocated in any suitable manner as for instance, by means of operating mechanism connected with the nipple 8. When the casing moves downward, the liquid within the well above the foot valve 23 will pass upward through the casing 3 and through the port of the valve seat 6, lifting the ball valve 7 and passing into the well casing above the stuffing box 11. When the tubular casing is lifted, the liquid above the stuffing box cannot pass downward through the tubular casing because of the valve 7, and as a partial vacuum is created below the stuffing box and between the same and the foot valve, liquid will flow from below the foot valve, through the port 24 into that portion of the well casing between the foot valve and the stuffing box. When the tubular casing again moves downward, a portion of the liquid between the stuffing box and the foot valve is forced upwardly through the tubular casing, as before described. It will be evident that the improved pump may be inserted in any well casing, no cylinder being required, the casing of the well being utilized as the cylinder of the pump.

The improved pump is especially designed for use in wells where a large amount of sand occurs. With the ordinary pump having cups, the sand by its cutting action soon ruins the cups, requiring them to be frequently renewed.

In the present construction, no cups are used, the tubular casing 3 acting as the piston or plunger of the pump. The packing 14 is entirely protected from the action of the sand. The reduced bore of the stuffing box at the lower end prevents sand working up around the tubular casing or barrel, while the packing nut 19 prevents the sand working down to the packing.

When the packing becomes worn, the spring 17 will expand, and will tighten the same, so that at all times there is a fluid tight joint between the well casing and the tubular casing or barrel of the pump.

I claim:—

1. A pump for use in a well casing, and comprising a seat for engagement within the casing, said seat having a frusto-conical bore and being arranged with the large end of the bore upward, a tubular casing extending through the bore of the seat, a stuffing box having its lower end tapering to fit the seat and having its bore internally reduced at the lower end to fit the tubular casing, a packing within the bore above the reduced portion, a coil spring within the bore above the packing, a packing nut encircling the tubular casing and threaded into the upper end of the stuffing box above the spring, a cage detachably connected with the upper end of the tubular casing and having a port, a ball valve within the cage and resting upon the port, a foot valve within the well casing below the seat, and a sleeve threaded on to the lower end of the tubular casing for engaging the lower end of the stuffing box to release the same when desired, the cage having means at its upper end for permitting it to be attached to operating means for the pump.

2. A pump of the character specified, adapted for use with a well casing having a foot valve, said pump comprising a tubular casing having a valve at its upper end for permitting the passage of liquid upwardly through the casing, a seat held within the casing, said seat having a frusto-conical casing, the casing extending through the bore, and the casing extending through the seat, a stuffing box having its lower end tapering to fit within the bore of the seat, said stuffing box fitting the casing at its lower end, and being spaced apart from the casing at its upper end, a packing within the space between the stuffing box and the casing, means for varying the pressure of the packing, and a stop on the lower end of the tubular casing for engaging the lower end of the stuffing box to permit the said box to be removed when the casing is drawn upward.

JOHN HENRY McGEE.

Witnesses:
C. MILLARD,
J. W. BRANTLEY.

Copies of this patent may be obtained for five cents each, by addressing the "Commissioner of Patents. Washington, D. C."